United States Patent [19]

Miller et al.

[11] 4,444,935

[45] Apr. 24, 1984

[54] COMPOSITIONS COMPRISING A THERMOPLASTIC RESIN AND AN ACRYLATE MOLD RELEASE AGENT

[75] Inventors: Kenneth F. Miller; Garland G. Lee, both of Mt. Vernon, Ind.

[73] Assignee: General Electric Company, Mt. Vernon, Ind.

[21] Appl. No.: 449,982

[22] Filed: Dec. 15, 1982

[51] Int. Cl.$^3$ ............................................. C08L 69/00
[52] U.S. Cl. ................................... 524/315; 524/560; 524/562; 524/565; 524/567; 524/570; 524/575; 524/590; 524/601; 524/603; 524/609; 524/611; 525/468
[58] Field of Search ............... 525/468, 445; 524/284, 524/601, 602, 609, 611, 612, 315, 560, 562, 565, 567, 570, 575, 590, 603

[56] References Cited

U.S. PATENT DOCUMENTS

| | | | |
|---|---|---|---|
| 3,186,961 | 6/1965 | Sears | 260/30.4 |
| 3,784,595 | 1/1974 | Schirmer et al. | 260/18 TN |
| 3,836,499 | 9/1974 | Schirmer et al. | 260/31.2 R |
| 4,065,436 | 12/1977 | Adelmann et al. | 260/18 TN |
| 4,082,715 | 4/1978 | Mercier | 24/295 |
| 4,097,435 | 6/1978 | Rawlings et al. | 525/277 |
| 4,131,575 | 12/1978 | Adelmann et al. | 524/611 |
| 4,399,251 | 8/1983 | Miller et al. | 524/481 |

*Primary Examiner*—Theodore E. Pertilla
*Attorney, Agent, or Firm*—Martin B. Barancik

[57] ABSTRACT

A composition comprising a thermoplastic resin in admixture with a mold release effective amount of an acrylate.

10 Claims, No Drawings

COMPOSITIONS COMPRISING A THERMOPLASTIC RESIN AND AN ACRYLATE MOLD RELEASE AGENT

BACKGROUND OF THE INVENTION

Useful articles from various thermoplastic resins have been prepared from molds for many years. Injection molding provides a convenient way for preparing various articles from thermoplastic resins, particularly objects of a relatively intricate nature. In order to injection mold articles in an economic manner the mold resident cycle time should be kept to a minimum. This shorter cycle time provides a shorter resin heat history with consequently less thermal damage to the resin itself and/or less thermally promoted interaction between the resin and various additives present in the resin. In order to accomplish a release of the part from the mold, various mold release agents have been found which provide for a release of the part with lower ejection pressure. Such an agent should be chemically compatible with the resin as measured by the usual characteristics of the resin under normal conditions and heat treatments.

Of the thermoplastic resins which find a mold release agent useful from time to time one of the most sensitive to chemical attack or degradation is the polycarbonates. The carbonate bond is susceptible to bond cleavage, for example, hydrolysis from the usual sources.

A series of patents and publications disclosing the use of carboxylic acid esters and paraffin waxes as mold release agents for polycarbonates are known.

U.S. Pat. No. 3,836,499—polycarbonate molding compositions having as a mold release additive an ester of a saturated aliphatic long chain monocarboxylic acid and a univalent aliphatic long chain alcohol.

U.S. Pat. No. 4,097,435—polycarbonate molding compositions including glass fibers, and an ester wax of montanic acid as a mold release additive. Example 2 uses the stearyl ester of behenic acid.

U.S. Pat. No. 3,784,595—polycarbonate molding compositions having as a mold release additive an ester of a trihydric alcohol and a $C_{10}$ to $C_{22}$ saturated aliphatic carboxylic acid.

U.S. Pat. No. 4,065,436—polycarbonate molding compositions having as a mold release additive an ester of a saturated aliphatic carboxylic acid with 10 to 20 carbon atoms per molecule and an aromatic hydroxy compound with from 1 to 6 hydroxyl groups.

U.S. Pat. No. 4,131,575—polycarbonate molding compositions having as a mold release additive an ester of a saturated aliphatic carboxylic acid with 10 to 20 carbon atoms and 4-hydric to 6-hydric alcohols.

Japanese Pat. No. 72 41,092—mold release agents are esters from $C_{12-30}$ aliphatic monocarboxylic acids and mono or polyhydroxy aliphatic saturated alcohol. Butyl stearate is a specific example. Stearinic acid is also employed in combination with polycarbonate.

U.S. Pat. No. 3,186,961—discloses many esters which can be used in polycarbonate as plasticizers.

U.S. Pat. No. 4,082,715—discloses use of esters in polycarbonate and shows the plasticizing ability of various esters.

Japanese Pat. Nos. 79 76,651; 79 16,559; and 80 84,353—all of these laid open patent applications disclose polycarbonate or polyestercarbonate with paraffin waxes.

SUMMARY OF THE INVENTION

In accordance with the invention, there is a composition comprising a thermoplastic resin in combination with a mold release effective amount a compound of the formula

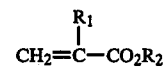

wherein
$R_1$ is hydrogen or alkyl of one to about four (4) carbon atoms, inclusive; and
$R_2$ is alkyl of about ten (10) to about thirty six (36) carbon atoms, inclusive.

Examples of various thermoplastic resins which are within the invention include aromatic carbonates polyesters, polysulfones, polyethersulfones, polyamides, polysulfides, polyurethanes, polyolefins, polyvinylhalides, acrylonitrile butadiene styrene, butadiene styrenes, methacrylate butadiene styrenes and the like and blends of the above with each other or a further thermoplastic resin. The preferred thermoplastic resin is an aromatic polycarbonate Aromatic carbonate polymers are prepared in the conventional manner by reacting a dihydric phenol with a carbonate precursor in an interfacial polymerization process. Typical of some of the dihydric phenols that may be employed in the practice of this invention are bisphenol-A, (2,2-bis(4-hydroxy-3-methylphenyl)-propane, 4,4-bis(4-hydroxyphenyl)heptane, 2,2(3,5,3',5'-tetrachloro-4,4'-dihydroxyphenyl)propane, 2,2-(3,5,3',5'-tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di(chlorophenyl)carbonate, di-(bromophenyl)carbonate, di-(trichlorophenyl)carbonate, di(tribromophenyl)carbonate, etc., di-(alkylphenyl)carbonate such as di(tolyl)carbonate, etc., di-(naphthyl)carbonate, di-(chloronaphthyl)carbonate, phenyl tolyl carbonate, chlorophenyl chloronaphthyl carbonate, etc., or mixtures thereof. The haloformates suitable for use herein include bis-haloformates of dihydric phenols (bis-chloroformates or hydroquinone), or glycols (bis-haloformates of ethylene glycol, neopentyl glycol, polyethylene glycol, etc.). While other carbonate precursors will occur to those skilled in the art, carbonyl chloride, also known as phosgene, is preferred.

The polycarbonate polymers of this invention may be prepared by employing a molecular weight regulator, an acid acceptor and a catalyst. The molecular weight regulators which can be employed in carrying out the process of this invention include monohydric phenols such as phenol, chroman-1, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium; bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl, hydroxyl (polyfunctional phenols) or mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

Within the definition of aromatic carbonate polymers are also copolyester-carbonates, that is the polymer made from a dihydric phenol, a dibasic acid and a phosgene precursor. U.S. Pat. Nos. 3,169,121, 4,194,038, 3,030,331, 4,156,069, 4,238,596, 4,236,597 covering copolyestercarbonates and methods of preparing them is hereby incorporated by reference.

The method of preparing the thermoplastic resins other than the aromatic polycarbonates are equally well known, consequently no detailed procedures of preparation are necessary.

The compounds useful in this invention are the acrylic type compounds of Formula I. Any acrylic compound which is insufficiently volatile at processing and molding conditions and temperatures so as to maintain most of its presence in the composition can be used. Preferred $R_1$ groups are hydrogen and methyl. Preferred $R_2$ groups are alkyl of fourteen (14) to about thirty two (32) carbon atoms, inclusive; more preferably eighteen (18) to about thirty two carbon atoms, inclusive. The alkyl groups may be normal or branched, preferably normal. Examples of the alkyl groups include methyl, ethyl, butyl, isodecyl, butyldecyl (14), octadecyl(18), eicosyl, hextricontyl, isopropyl, 3,3-diethyldodecyl, 2,6-dimethyleicosyl and the like. Illustrative compounds of Formula I include n-decylmethacrylate, n-butyldecylacrylate, isooctadecyl methacrylate, eicosylpropacrylate, 2,6-diethyleicosylacrylate, n-hexatricontylmethacrylate and the like.

An effective mold releasing amount of the compound of Formula I is employed in the thermoplastic composition. Any amount of material which reduces the amount of pressure needed to eject the article from the injection mold and obtain an substantially unblemished article in comparison to the pressure needed to eject the thermoplastic composition control is an effective mold releasing amount. In general, effective amounts of the compound of Formula I is from about 0.01 to about 1.0 weight percent, based on the quantity of thermoplastic resin present, preferably from about 0.05 to about 0.5 weight percent. The material can be added to the resin in the normal manner that the other additives are added, for example, in the dry or liquid stage and coextruded or in a solvent and melt extruded with the resin. Depending upon the volatility of the compound at common processing and extrusion temperatures, an excess may be initially employed in the composition.

Other additives in common use in the thermoplastic resins may also be employed. For example with respect to aromatic polycarbonate, additives which are commonly known to stabilize the resin thermally such as a phosphite can be employed. Hydrolytic stabilizers such as epoxides may also be employed as well as agents which are flame retardants, drip inhibitors, ductility enhancers, antioxidants, solvent resistance enhancers, ultraviolet light stabilizers and various inert fillers. Impact modifiers may also be present in the composition. Active fillers and pigments can be used with passivating agents and treatments.

Below are specific examples of the invention. The examples are intended to illustrate but not narrow the inventive concept. All percentages of the additives are in weight percent of the thermoplastic resin.

EXAMPLE 1

In all the ensuing examples the aromatic polycarbonate is Lexan ® 140, a polymer produced by reacting bisphenol-A and phosgene. The mold release agent was dry formulated into the polycarbonate at levels of 0.3 weight percent unless otherwise stated. Also present in the composition is 0.03 weight percent of a phosphite stabilizer.

EXAMPLE 2

In an injection molding machine with a 4 ounce shot capacity, various mold release agents were tested. The part molded was a 3"×3" box with a 1½" wall height. It had ejector pins at four corners with two of the pins being attached to strain gauge transducers for measuring the part ejection pressure. The mold was designed with very little draft so that the part would tend to stick to the core unless mold release is used. To vary the amount of shrinkage on the core, the temperature of the stationary and moving mold halves could be varied.

Below are the ejector pin pressure values in pounds per square inch in arithmetic mean plus or minus two standard deviations for the various mold release agents tested.

TABLE 1

| Mold Release Agent | Ejector Pin Pressure |
| --- | --- |
| None (control) | Pins punched through |
| Pentaerythritol Tetrastearate (PETS) | 10,200 ± 84 |
| Octadecyl methacrylate | 4,805 ± 196 |
| $$CH_2{=}\overset{CH_3}{\underset{|}{C}}{-}CO_2C_{18}H_{37}$$ | |

As is observed from the above results, the acrylate provided substantially better mold release results than a commercially employed release agent, PETS.

EXAMPLE 3

In a similar manner, other acrylates wherein R is for example isodecyl, n-eicosyl, 2,4-di-n-propyleicosyl and the like can be formulated into polycarbonate and similar results as with the acrylate of Example 2 should be obtained.

EXAMPLE 4

The acrylates of Examples 2 and 3 can be formulated into other thermoplastics such as polyesters, polysulfones, polyethersulfones, polyamides, polysulfides, polyacrylates, polyurethanes, polyolefins, polyvinylhalides, acrylonitrile butadiene styrenes, butadiene styrenes, methacrylate butadiene styrenes and the like and similar results as obtained with polycarbonate should be obtained.

What is claimed is:

1. A composition comprising a thermoplastic resin selected from the group consisting of aromatic polycarbonate, polyester, polysulfone, polyethersulfone, polyamide, polysulfide, polyurethane, polyolefin, polyvinylhalide, acrylonitrile butadiene styrene, butadiene styrene, and methacrylate butadiene styrene in admixture with a mold release effective amount of a compound of the formula $$CH_2{=}\overset{R_1}{\underset{|}{C}}{-}CO_2R_2$$

wherein $R_1$ is hydrogen or alkyl of one to about four carbon atoms, inclusive; and $R_2$ is alkyl of about ten to about thirty six carbon atomes, inclusive.

2. The composition in accordance with claim 1 wherein the thermoplastic resin is an aromatic polycarbonate.

3. The composition in accordance with claim 2 wherein $R_1$ is hydrogen or methyl.

4. The composition in accordance with claim 3 wherein $R_2$ is about fourteen to about thirty-two carbon atoms, inclusive.

5. The composition in accordance with claim 4 wherein the said compound is from about 0.01 to about 1.0 weight percent of the thermoplastic resin.

6. The composition in accordance with claim 5 wherein the said compound is from about 0.05 to about 0.5 weight percent.

7. The composition in accordance with claim 4 wherein $R_1$ is n-octadecyl.

8. The composition in accordance with claim 4 wherein the aromatic polycarbonate is derived from bisphenol A.

9. The composition in accordance with claim 1 wherein the thermoplastic resin is polyester, polysulfone, polyethersulfone, polyacrylate, polyamide, polysulfide, polyurethane, polyolefin, polyvinylhalide, acrylonitrile butadiene styrene, butadiene styrene or methacrylate butadiene styrene.

10. A composition in accordance with claim 9 wherein $R_1$ is hydrogen or methyl.

* * * * *